United States Patent
Nishino et al.

(10) Patent No.: US 7,209,170 B2
(45) Date of Patent: Apr. 24, 2007

(54) SOLID-STATE ELECTRONIC IMAGE PICKUP APPARATUS AND METHOD OF DRIVING THE SAME

(75) Inventors: Naoyuki Nishino, Asaka (JP); Hiroyuki Uchiyama, Asaka (JP); Takaaki Kotani, Fuchu (JP); Soichiro Kimura, Asaka (JP)

(73) Assignee: Fujifilm Corporation, Tokyo (JP)

(*) Notice: Subject to any disclaimer, the term of this patent is extended or adjusted under 35 U.S.C. 154(b) by 754 days.

(21) Appl. No.: 10/329,464

(22) Filed: Dec. 27, 2002

(65) Prior Publication Data

US 2003/0122946 A1   Jul. 3, 2003

(30) Foreign Application Priority Data

Dec. 28, 2001 (JP) .............................. 2001-399616
Aug. 27, 2002 (JP) .............................. 2002-246181

(51) Int. Cl.
*H04N 5/14* (2006.01)
*H04N 5/222* (2006.01)
*H01L 27/00* (2006.01)
*H01L 31/062* (2006.01)

(52) U.S. Cl. ..................... 348/302; 348/296; 348/371; 250/208.1; 257/291

(58) Field of Classification Search ................ None
See application file for complete search history.

(56) References Cited

U.S. PATENT DOCUMENTS

| | | | | |
|---|---|---|---|---|
| 4,858,020 | A * | 8/1989 | Homma | 348/240.2 |
| 4,910,599 | A * | 3/1990 | Hashimoto | 348/240.2 |
| 5,920,348 | A * | 7/1999 | Ejima | 348/341 |
| 6,580,457 | B1* | 6/2003 | Armstrong et al. | 348/302 |
| 6,847,070 | B2* | 1/2005 | Fox | 257/291 |
| 6,947,082 | B2* | 9/2005 | Gomi | 348/230.1 |
| 2003/0007088 | A1* | 1/2003 | Rantanen et al. | 348/371 |
| 2003/0206235 | A1* | 11/2003 | Suzuki | 348/308 |

* cited by examiner

*Primary Examiner*—David Ometz
*Assistant Examiner*—Nhan T. Tran
(74) *Attorney, Agent, or Firm*—Sughrue Mion, PLLC

(57) ABSTRACT

In order to reduce the frame rate, when all photodiodes contributing to output of a video signal in a CMOS image sensor must be simultaneously exposed (at the timing of strobe flashing Δts), as in a case where strobe is flashed, readout pixels composing the CMOS type image sensor are thinned such that the number of photodiodes contributing to the video signal outputted from the CMOS type image sensor is reduced. A time period Δtp2 required for processing (of the video signal caused by a row of photodiodes) in an analog processing circuit connected to the succeeding stage of the CMOS type image sensor is shortened, thereby reducing the frame rate.

10 Claims, 11 Drawing Sheets

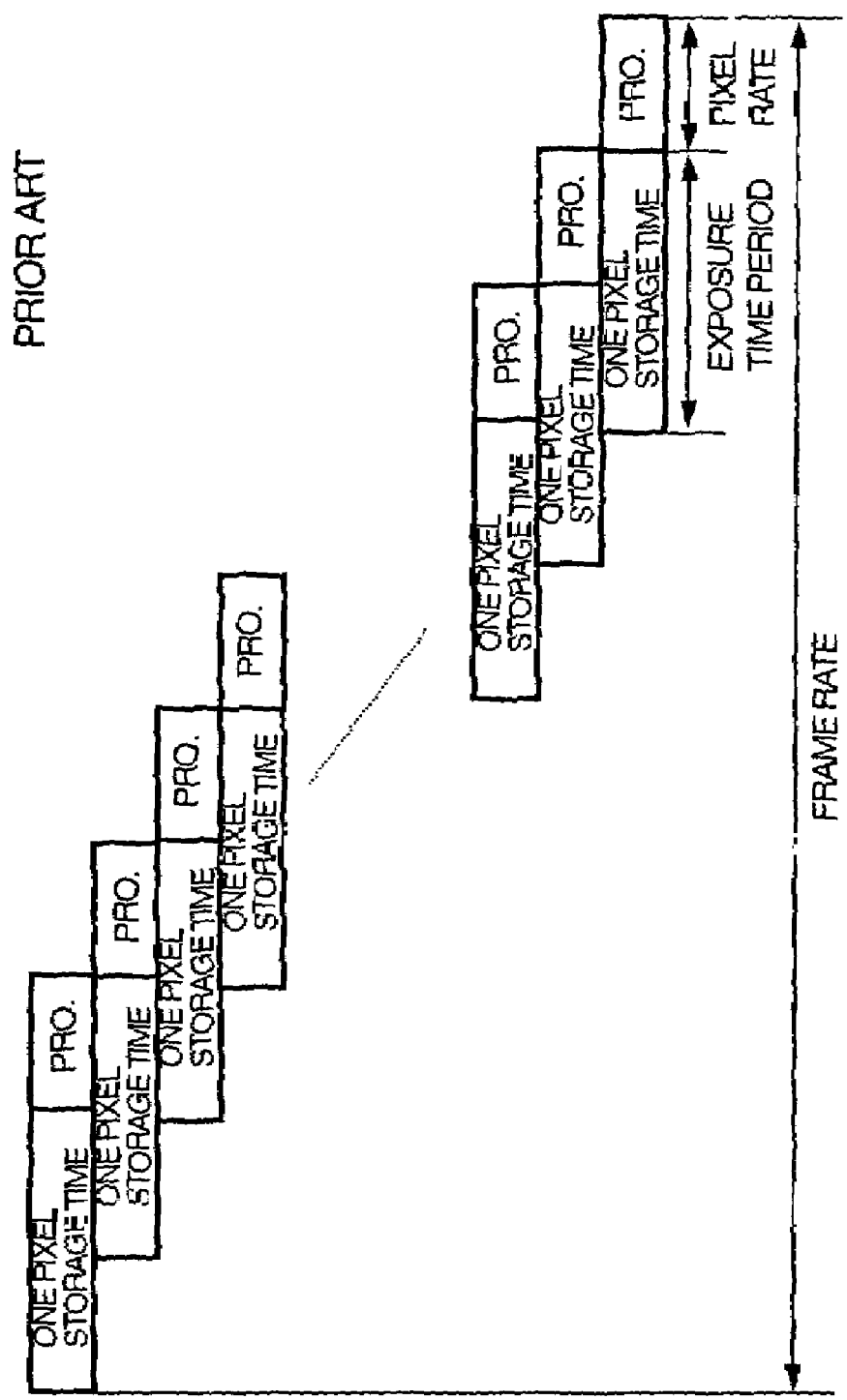

SOLID-STATE ELECTRONIC IMAGE PICKUP APPARATUS AND METHOD OF DRIVING THE SAME

BACKGROUND OF THE INVENTION

1. Field of the Invention

The present invention relates to a solid-state electronic image pickup apparatus comprising an image sensor having a lot of photoelectric conversion devices (transducers) (pixels) arranged two dimensionally and capable of being selective readout (random access) and a method of driving the same, and an electronic camera including the solid-state electronic image pickup apparatus.

2. Description of the Background Art

In image sensors capable of being selective readout (such as a CMOS (Complementary Metal-Oxide Semiconductor) type and a CID (Charge Injection Device) type) as shown in FIG. 13, signal charges respectively accumulated in photoelectric conversion devices are successively outputted for each pixel (photoelectric conversion device) as a video signal corresponding to one frame. The video signal outputted from the image sensor is inputted to an analog processing circuit including an amplification circuit, a correlated double sampling circuit, and an analog-to-digital conversion circuit. A video signal corresponding to the subsequent pixel cannot be inputted to the analog processing circuit until analog processing (in FIG. 13, only the term "PRO." is shown) for one pixel (one photoelectric conversion device) is terminated in the analog processing circuit. The time period required for analog processing of the video signal (signal charge) for one pixel in the analog processing circuit is referred to as a pixel rate (the unit thereof is a frequency or time period which is a reciprocal of the frequency). Then, the time period required for analog processing of the video signal for one frame (referred to as a frame rate: the unit thereof is a frequency or time period) is more than the time period corresponding to the product of the pixel rate and the number of pixels (photoelectric conversion devices) provided on the image sensor.

In the above type of image sensor, the signal charge accumulation time period (exposure time period) of the photoelectric conversion device may be arbitrary set, so that even if there is a limit to shorten the pixel rate, this limit does not affect the shutter speed.

However, in a case of strobe flash (electronic flash) imaging, all the photoelectric conversion devices on the image sensor have to be exposed simultaneously in the time period of strobe flash (flash synchronization). As a result, the shutter speed becomes low and frame rate becomes long.

SUMMARY OF THE INVENTION

An object of the present invention is to reduce the frame rate.

Another object of the present invention is maintain the shutter speed (exposure time period) relatively high (short) while the flash synchronization is attained.

A solid-state electronic image pickup apparatus according to the present invention comprises an image sensor having a lot of photoelectric conversion devices two dimensionally arranged, wherein a signal charge accumulation time period and readout timing of the signal charge are individually controllable for each photoelectric conversion device, and a drive circuit for driving, in a specified mode in which signal charges are read out from a plurality of specified photoelectric conversion devices which are a part of whole photoelectric conversion devices of the image sensor, the specified photoelectric conversion devices successively and at a predetermined time interval, such that the signal charge accumulation time periods assigned to each of specified photoelectric conversion devices are equal to each other and include a common time period in which the signal charge accumulation time periods of the specified photoelectric conversion devices are partially overlapped with each other.

A method of driving a solid-state electronic image pickup apparatus according to the present invention comprises the steps of using an image sensor having a lot of photoelectric conversion devices two dimensionally arranged, wherein a signal charge accumulation time period and readout timing of the signal charge are individually controllable for each photoelectric conversion device, and driving, in a specified mode in which signal charges are read out from a plurality of specified photoelectric conversion devices which are a part of whole photoelectric conversion devices of the image sensor, the specified photoelectric conversion devices successively and at a predetermined time interval, such that the signal charge accumulation time periods assigned to each of specified photoelectric conversion devices are equal to each other and include a common time period.

The whole photoelectric conversion devices of the image sensor means to include all effective photoelectric conversion devices provided on the image sensor which contribute to produce a video (an image) signal representing the picked-up image, but exclude photoelectric conversion devices which do not substantially contribute to the video signal such as an optically shielded photoelectric conversion device defining a black level, or a dummy photoelectric conversion device.

The number of the specified photoelectric conversion devices is (that is, a part of the whole photoelectric conversion devices means) preferably, less than a half of the number of the whole photoelectric conversion devices, or a reciprocal of integer (one-third, one-fourth, and so on) in order to attain the object of the present invention.

In one embodiment, the specified photoelectric conversion devices are photoelectric conversion devices arranged in a part of the imaging area of the image sensor.

Preferably, the part area is a central part of the imaging area.

In another embodiment, the specified photoelectric conversion devices are a set of photoelectric conversion devices regularly selected in the imaging area of the image sensor.

In a case where the image sensor includes a lot of photoelectric conversion devices arranged in the row direction and the column direction in the imaging area, the specified photoelectric conversion devices are a set of photoelectric conversion devices regularly selected by thinning out in the row direction and column direction.

The signal charge accumulation time period of the photoelectric conversion device is the exposure time period which means the time period from the time when the photoelectric conversion device is reset to the time when the readout of the signal charge is started.

Driving of the photoelectric conversion devices successively and at a predetermined time interval means that readout of the signal charges from the photoelectric conversion devices is started (and resetting of the photoelectric conversion devices is executed prior thereto) in a predetermined order of the photoelectric conversion devices at a time interval of substantially pixel rate (an analog processing time period). More specifically, switching devices corresponding to the photoelectric conversion devices is controlled in order to read the signal charges from the photoelectric conversion devices.

According to the present invention, the signal charges are successively read out at a predetermined time interval only for limited number of photoelectric conversion devices of the whole photoelectric conversion devices provided on image sensor, the frame rate can be reduced, even if there is a limit to shorten the pixel rate.

Further strobe synchronization can be attained, since the common time period in which the signal charge accumulation time periods of the specified photoelectric conversion devices are partially overlapped is provided.

That is, in accordance with the present invention, in the strobe flashing (electronic flashing) mode (which is manually or automatically set), the image sensor is driven in the specified mode and a strobe flashing device is controlled such that strobe is flashed in the common time period. When the strobe flashing mode is (manually or automatically) set, the drive circuit operates in the specified mode.

In this way, since all the specified photoelectric conversion devices are simultaneously exposed by the strobe flash in the common time period, a suitable strobe imaging can be performed. Further the number of the specified photoelectric conversion devices is less than that of the whole photoelectric conversion devices, so that the signal charge accumulation time period in the photoelectric conversion devices, i.e., the shutter speed can be relatively high.

In an ordinary mode in which the signal charges are read out from the whole photoelectric conversion devices on the image sensor, the whole photoelectric conversion devices are successively driven at a predetermined time interval such that the signal charge accumulation time periods are equal to each other in the whole photoelectric conversion devices (the common time period is not necessarily provided). The solid-state electric image pickup apparatus has the specified mode and the ordinary mode which can be selectively set.

The present invention can be adapted to driving in the multiple readout (inclusive of interlace) and also to all types of image sensors including monochrome and color image sensors which are capable of selective readout.

In one embodiment of the present invention, the image sensor comprises a lot of photoelectric conversion devices arranged in the row direction and the column direction in the imaging area, vertical signal lines each formed adjacent to each of columns of photoelectric conversion devices for transmitting in the vertical direction a signal corresponding to signal charges respectively accumulated in the photoelectric conversion devices, first semiconductor switching devices provided between the photoelectric conversion devices and the vertical signal line, a horizontal signal line for transmitting in the horizontal direction the signal transmitted from the vertical signal line, and second semiconductor switching devices each provided between the vertical signal line in each of the columns and the horizontal signal line, and outputs the signal charges respectively accumulated in the photoelectric conversion devices as a video signal from the horizontal signal line. The drive circuit, on reading the signal charge out of each specified photoelectric conversion device, controls the first and second switching devices corresponding to each specified photoelectric conversion device so as to select each specified photoelectric conversion device successively along the row and column directions and at the predetermined time interval. The row and column directions include slightly zigzagged directions.

An electronic camera according to the present invention includes the above solid-state electronic image pickup apparatus as an imaging apparatus, and comprises recording control means for recording on a recording medium (inclusive of a memory) the video signal (inclusive of an analog video signal and a digital image data) outputted from the solid-state electronic image pickup apparatus. The electronic camera also has at least the specified mode and ordinary mode which can be selectively set. The electronic camera may be provided with the above strobe flashing device and the control device for controlling the strobe flashing device such that strobe is flashed in the common time period in the specified mode (strobe flashing mode).

Also in the electronic camera, the frame rate can be reduced, thereby making it possible to shorten the intervals of imaging. It is possible to prevent a problem that an imaging scene is restricted.

The foregoing and other objects, features, aspects and advantages of the present invention will become more apparent from the following detailed description of the present invention when considered in conjunction with the accompanying drawings.

BRIEF DESCRIPTION OF THE DRAWINGS

FIG. 13 is a time chart showing an example of prior art readout operation in an image sensor.

DESCRIPTION OF THE PREFERRED EMBODIMENTS

Figure 1:
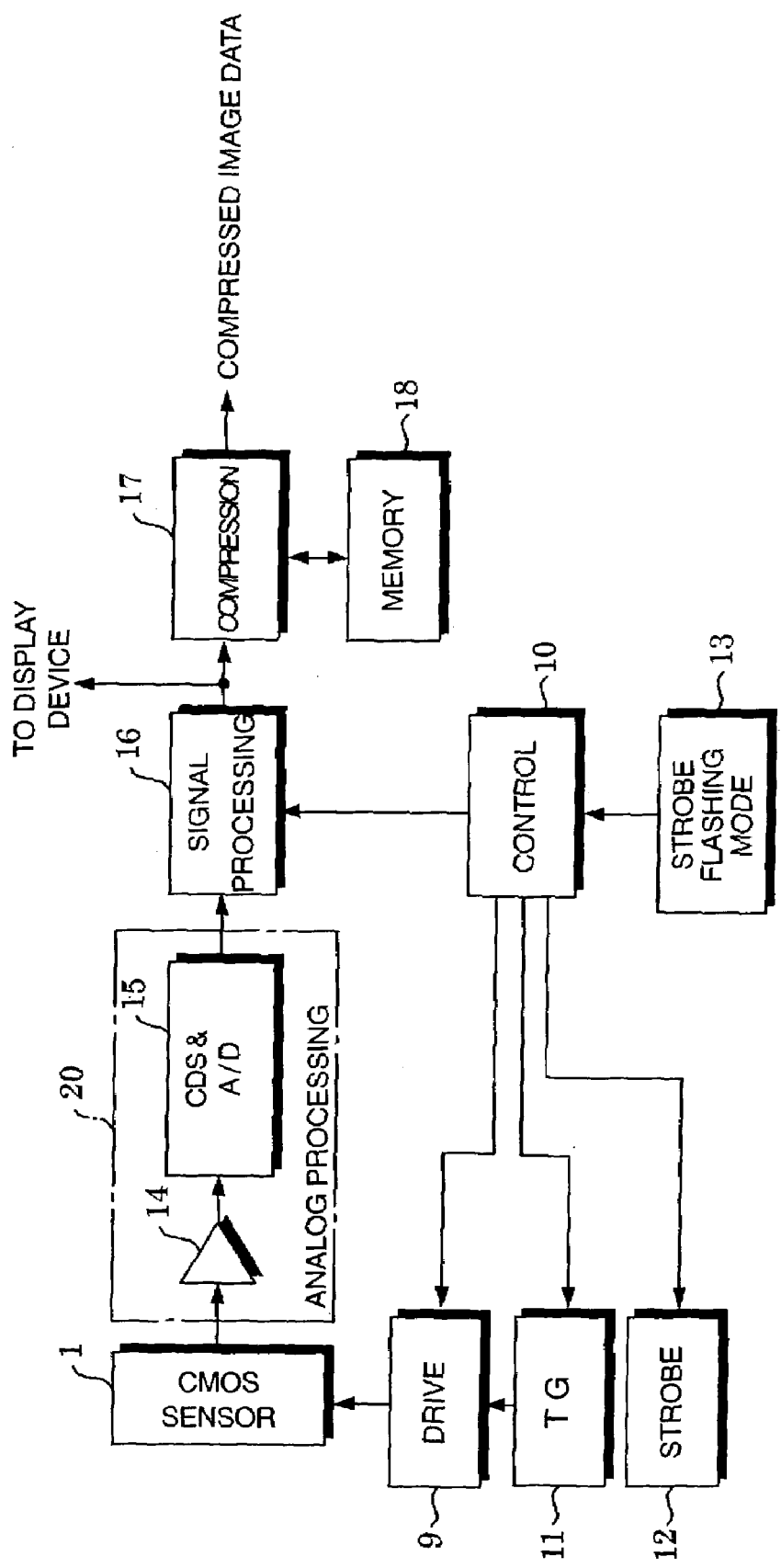
FIG. 1 is a block diagram showing the electrical configuration of a digital still camera.

FIG. 1 is a block diagram showing a part of the electrical configuration of a digital still camera comprising a CMOS type image sensor.

The overall operation of the digital still camera is supervised by a control circuit 10.

The digital still camera is provided with a strobe (electronic) flashing device 12 such that strobe (electronic) flash imaging can be performed. A strobe flashing mode is set by a strobe flashing mode switch 13 (a strobe flashing mode may be automatically set by the control circuit 10 in accordance with exposure conditions, and so on.). When a signal representing the strobe flashing mode is inputted to the control circuit 10, the control circuit 10 and the strobe flashing device 12 enter the strobe flashing mode, in which it emits light in response to the timing of imaging (the timing of strobe flashing will be described in detail later).

Various types of clock pulses are outputted from a timing generator 11, and are fed to a drive circuit 9 of a CMOS type image sensor 1. The drive circuit 9 drives the CMOS type image sensor 1 based on the various types of clock pulses fed from the timing generator 11 and a control signal fed from the control circuit 10 in dependence upon the set mode.

When an imaging mode (the imaging mode includes a specified mode (strobe flashing mode) and an ordinary mode as described later) is set, a subject is imaged in a predetermined period by the CMOS type image sensor 1. A video signal representing an image of the subject is outputted at a predetermined frame rate, and is inputted to an amplification circuit (an amplifier) 14 constituting an analog processing circuit 20. The video signal amplified by the amplification circuit 14 is subjected to correlated double sampling processing and analog-to-digital conversion processing in a CDS (Correlated Double Sampling) and A/D (Analog-to-Digital) conversion circuit 15, respectively. Output image data from the A/D conversion circuit 15 is an output of the analog processing circuit 20, and the output is inputted to a signal processing circuit 16.

A signal charge (a video signal) is readout from the image sensor 1 for each pixel (photoelectric conversion device). The readout timing of the signal charge from each pixel is defined by the analog processing time (period) (pixel rate) of the signal charge for one pixel in the analog processing circuit 20.

In the signal processing circuit 16, predetermined signal processing for image data such as gain control processing, white balance adjustment processing, gamma correction processing, and luminance data and color difference data generation processing is performed. Image data outputted from the signal processing circuit 16 is fed to a display device (, for example, a viewfinder, not shown). On a display screen of the display device (for example, a liquid crystal display), the subject image obtained by the imaging is displayed.

In a case where the strobe flashing mode is set by the strobe flashing mode switch 13 (in a case where the strobe flashing mode is not set, the camera is in the ordinary mode in this embodiment), when a shutter release button (not shown) is pressed, the strobe flashing device 12 emits light in synchronization with the timing of pressing the shutter release button at a timing of a common time period referred to later.

The image data outputted from the signal processing circuit 16 is fed to a memory 18 through a compression circuit 17, and is temporarily stored therein. The image data is read out of the memory 18, and is subjected to data compression such as jpeg (joint photographic experts group) in the compression circuit 17. The compressed image data is outputted, and is recorded on a recording medium such as a memory card.

Figure 2:
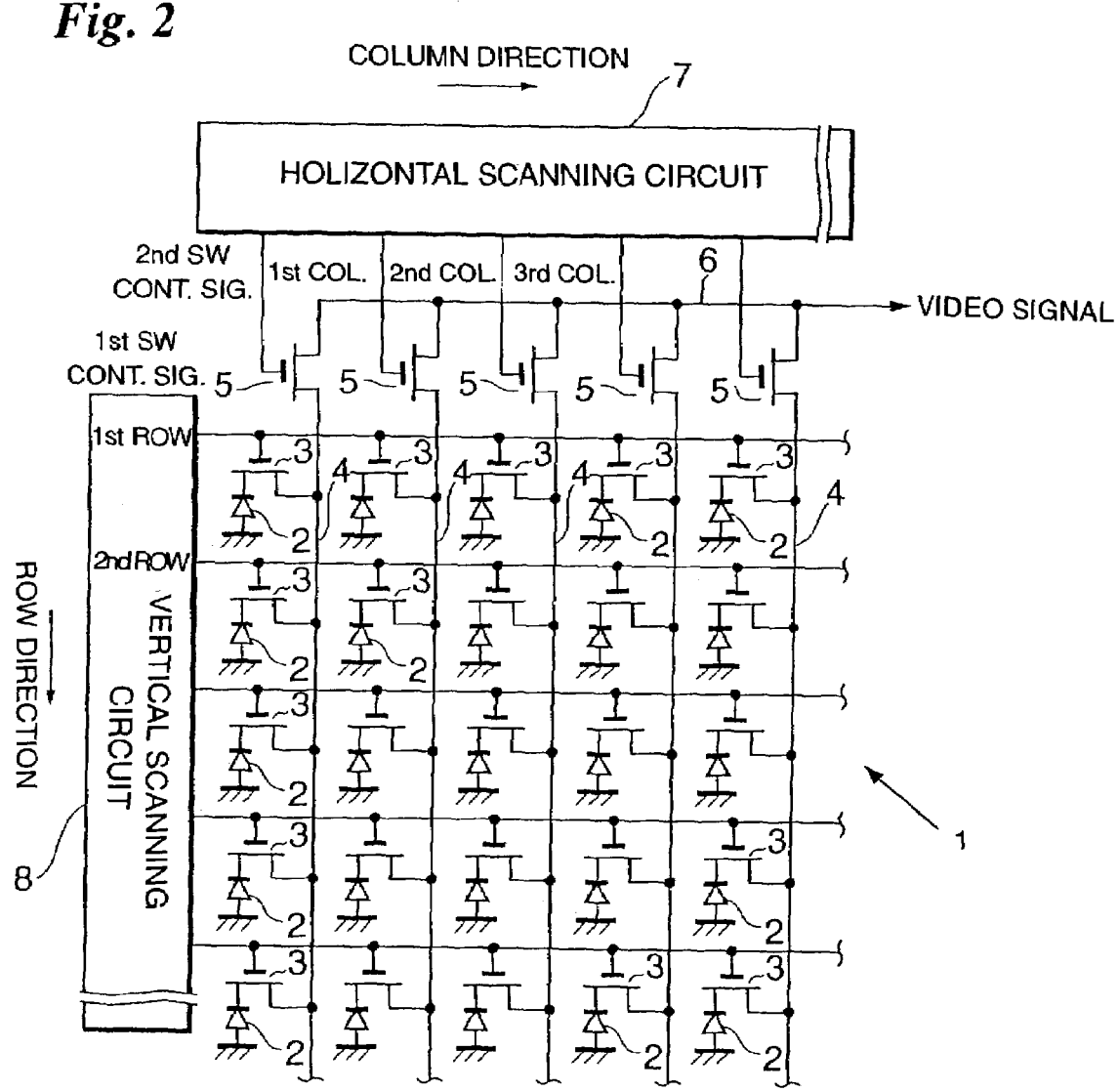
FIG. 2 illustrates the electrical configuration of a CMOS type image sensor.

FIG. 2 schematically illustrates an example of the electrical configuration of the CMOS type image sensor 1. The CMOS type image sensor may be, in same cases, provided with a switching device, or amplifying device for each photodiode.

The CMOS type image sensor 1 comprises a lot of photodiodes (photoelectric conversion devices) 2 arranged and comprising 480 photodiodes in the row direction and 640 photodiodes in the column direction. A vertical signal line 4 adjacent to each of columns of photodiodes 2 is formed. A first semiconductor switching device 3 is provided between the vertical signal line 4 and the photodiode 2.

The first switching devices 3 are connected to a vertical scanning circuit 8 at a control terminal thereof. The first switching device 3 in the desired row is turned on in response to a switching control signal (a first switching control pulse) outputted from the vertical scanning circuit 8. The first switching device 3 is turned on, whereby the signal charge accumulated in the photodiode 2 is shifted to the vertical signal line 4.

One video signal line (a horizontal signal line) 6 is formed in the CMOS type image sensor 1. The vertical signal line 4 in each of the columns is connected to the video signal line 6 through a second semiconductor switching device 5. A switching control signal (a second switching control pulse) outputted from a horizontal scanning circuit 7 is fed to the second switching devices 5, whereby the desired second switching device 5 is turned on. The second switching device 5 is turned on, whereby a signal (signal charge of one pixel) transmitted from the vertical signal line 4 is outputted as a video signal from the CMOS type image sensor 1.

The lot of photodiodes 2 and switching devices 3 and 5, the vertical signal lines 4 and the horizontal signal line 6 are, in general, integrally fabricated on a semiconductor substrate. The drive circuit 9 comprises the horizontal and vertical scanning circuits 7 and 8, which successively control in a predetermined order a pair of switching devices 3 and 5 selected in accordance with the ordinary mode or the specified mode (strobe flashing mode). The image sensor 1 is provided with a circuit for resetting the photodiodes 2 (for defining start timing of the signal charge accumulation time period, i.e., start timing of the exposure time period) which is similar to the circuit comprising the switching devices 3 and 5 and the vertical and horizontal signal lines 4 and 6, although the reset circuit is not shown in FIG. 2 for simplification.

The digital still camera according to the present embodiment performs ½ pixel thinning (it may be another thinning method, or a video signal in a selected partial area may be readout) when the strobe flashing mode (the specified mode) is set. In order to clarify the difference between ½ pixel thinning and all-pixel readout (operation in the ordinary mode), description is now made of all-pixel readout (although the all-pixel readout is provided with the common time period for strobe flashing for easy understanding, the common time period may not be necessarily provided, since the specified mode described later is set for strobe flashing).

Figure 3:
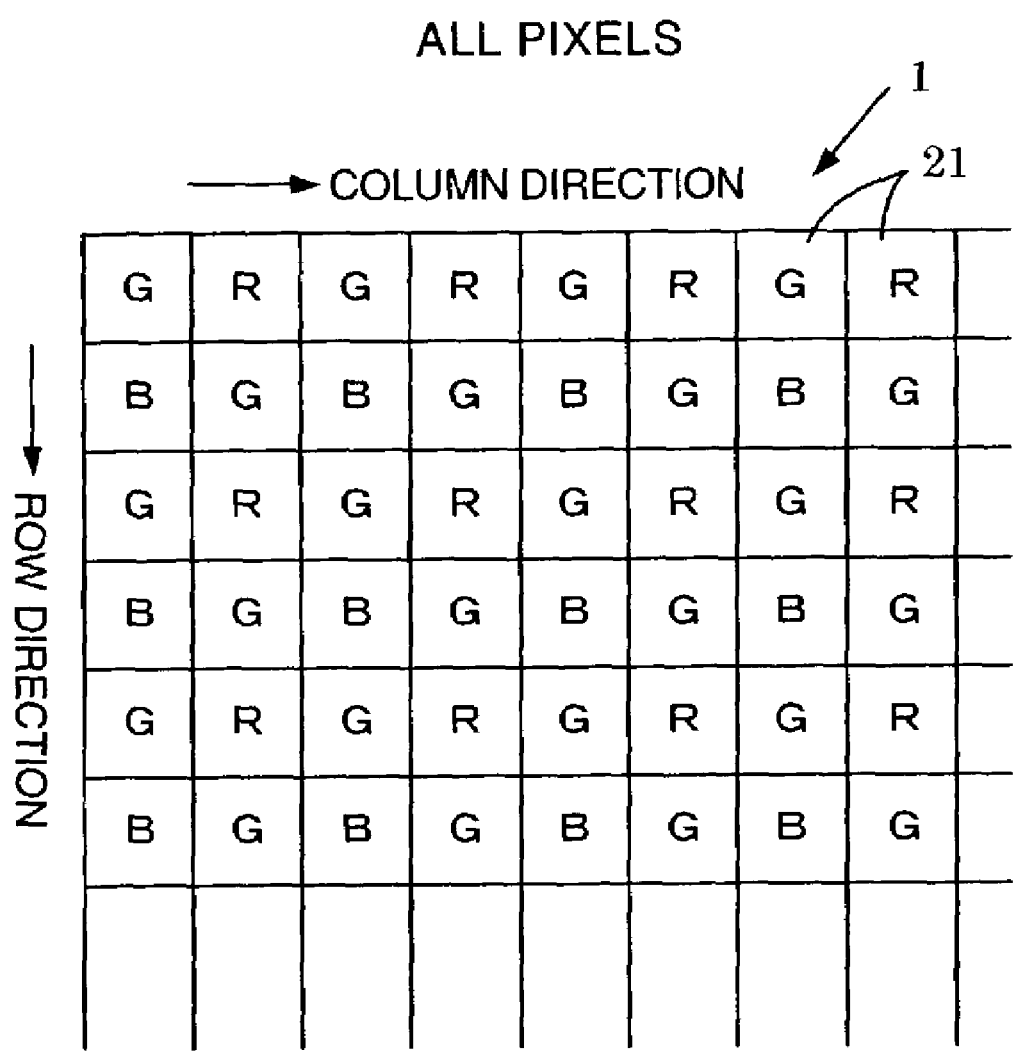
FIG. 3 illustrates a part of a light receiving surface of a CMOS type image sensor.

FIG. 3 illustrates a part of a light receiving surface (sensing surface) of the CMOS type image sensor 1.

Each of sections 21 corresponds to one of the photodiodes 2, and corresponds to one of pixels. On a light receiving surface of the photodiode 2, there are provided a G color filter (indicated by G) having the properties of transmitting a green light component, an R color filter (indicated by R) having the properties of transmitting a red light component, or a B color filter (indicated by B) having the properties of transmitting a blue light component (Beyer arrangement).

Figure 4:
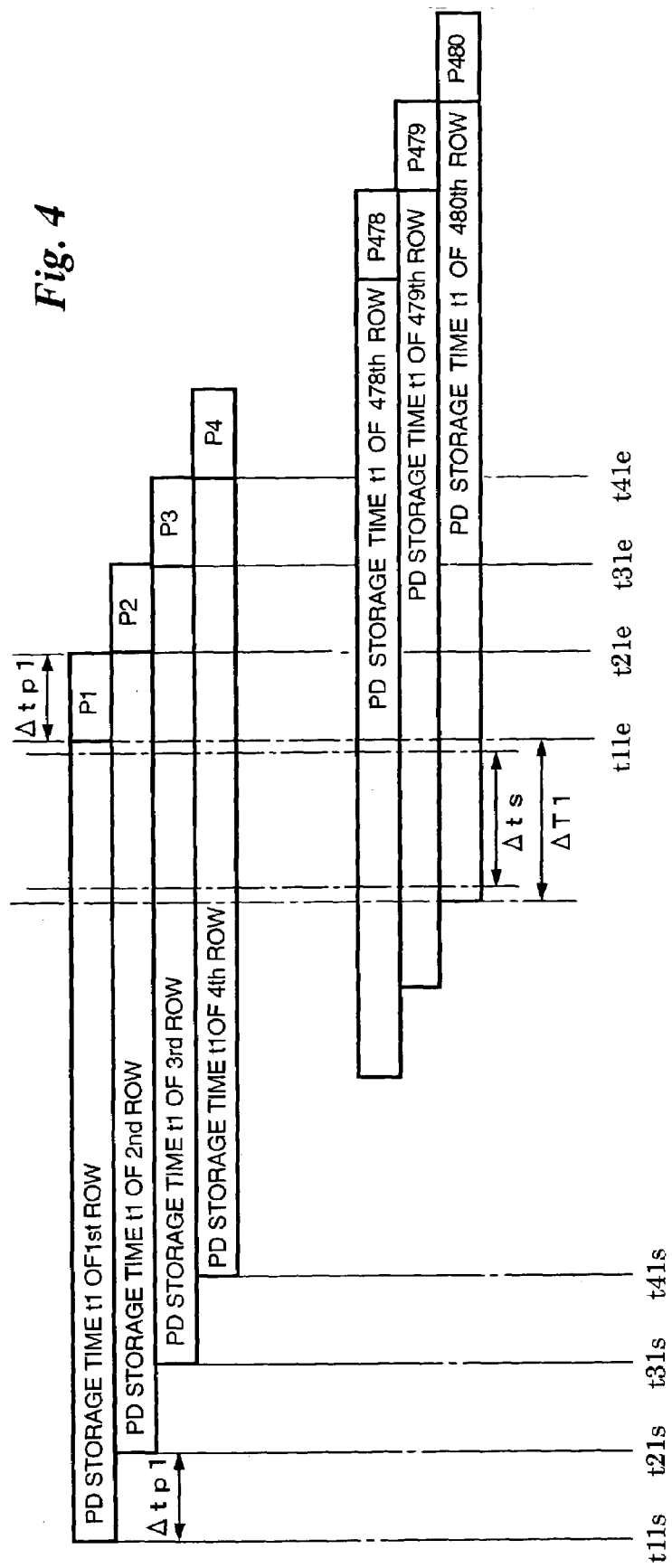
FIG. 4 is a timing chart in all-pixel readout.
Figure 5:
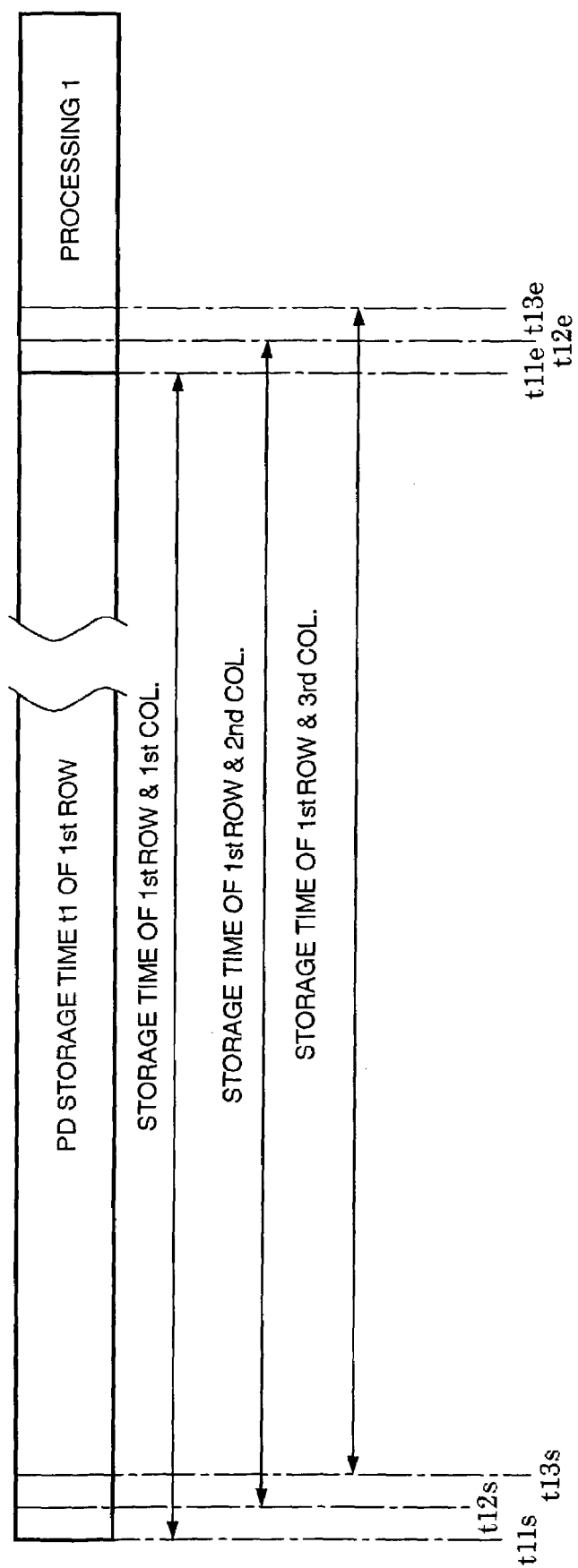
FIG. 5 is a partially enlarged view of the timing chart shown in FIG. 4.

FIG. 4 is a timing chart for each row in flashing strobe in a case where all pixels corresponding to one frame are read out (in a case where signal charges respectively accumulated in all the photodiodes 2 in the CMOS type image sensor 1 are read out), and FIG. 5 is a timing chart showing a part of FIG. 4 in enlarged fashion, that is, one row is enlarged to show readout timing for each pixel. The analog processing is indicated by just P1, P2, P3 and soon in FIG. 4, and is indicated by PROCESSING 1 in FIG. 5.

In the case of strobe flashing, strobe must be flashed in the common time period (flashing time period) (a time period of Δts) when all the photodiodes 2 accumulate signal charges.

That is, in the time period (i.e., the common time period) when strobe is flashed, all the photodiodes 2 must accumulate or store signal charges. When strobe is flashed in all-pixel readout, all time periods respectively required for the photodiodes 2 to accumulate the signal charges are set to t1 so as to have a time period (the common time period) ΔT1 during which all the photodiodes 2 simultaneously accumulate the signal charges.

The time period while the photodiode accumulates the signal charge is the exposure time period, which is the time period from the time when the photodiode is reset to the time when the readout of the signal charge is started (the readout starting is controlled by the switching devices 3 and 5). That is to say, with regard to the photodiode which the start of the readout of the signal charge is controlled by the pair of the switching devices 3 and 5, a resetting processing (discharge of the signal charge accumulated theretofore) is performed by switching devices (not shown) for resetting at the time going back from the start of the readout by the exposure time period.

Referring to FIGS. 2 to 5, in a case where all pixels are read out, the photodiode 2 in the first row and the first column positioned at an upper left end in FIG. 2 is first reset at the time t11s. The storage (accumulation) of the signal charge in the photodiode 2 in the first row and the first column is started. In FIG. 5, the storage of the signal charge in the photodiode 2 in the first row and the first column is continued until the time t11e elapsed by a time period t1 from the time t11s. At the time t11e, the first switching device 3 corresponding to the photodiode 2 in the first row and the first column is turned on by the control signal (the first switching control pulse) from the vertical scanning circuit 8, and at the same time, a (second) switching control pulse is outputted from the horizontal scanning circuit 7 such that the second switching device 5 connected to the vertical signal line 4 in the first column is turned on. Consequently, a current is produced on the vertical signal line 4 in the first column and the horizontal signal line 6 on the basis of the signal charge accumulated in the photodiode 2 in the first row and the first column and the current is outputted as a video signal from the CMOS type image sensor 1 in correspondence with the amount of the signal charge accumulated in the photodiode 2 in the first row and the first column. The video signal outputted from the CMOS type image sensor 1 is inputted to the analog processing circuit 20, as described above, where analog processing is performed. A time period required for the analog processing Δtp1 for all the photodiodes arranged in the first row is illustrated as P1 and processing 1 in FIGS. 4 and 5, respectively. Accordingly, the time period required for the analog processing for the signal charge accumulated in one photodiode 2 is the time period (pixel rate) obtained by dividing Δtp1 by the number of photodiodes arranged in one row (e.g. 640).

Similarly, the photodiode 2 in the first row and the second column is reset at the time t12s. The storage of the signal charge in the photodiode 2 in the first row and the second column is started. The storage of the signal charge in the photodiode 2 in the first row and the second column is continued until the time t12e elapsed by a time period t1 from the time t12s. In the same manner as described above, a video signal obtained on the basis of the signal charge accumulated in the photodiode 2 in the first row and the second column is outputted from the CMOS type image sensor 1. Thereafter, analog processing is performed in the analog processing circuit 20.

The video signal obtained on the basis of the signal charges respectively accumulated in the photodiodes 2 in the first row is thus outputted from the CMOS type image sensor 1 successively one pixel by one pixel at the pixel rate time interval, and in the course of this process, similarly, the video signal is subjected to analog processing in the analog processing circuit 20 successively one pixel by one pixel at the pixel rate time interval. The time period required for analog processing corresponding to one row is the time period Δtp1 even in any row, if the number of photodiodes belongs each row is the same.

When the signal charges have been read out of all the photodiodes belong to the first row and have been subjected to the analog processing, then the read out of the signal charges from the photodiodes arranged in the second row is started. The time when the storage of the signal charge in the photodiode 2 in the second row (the photodiode 2 in the second row and the first column) is started (reset) is the time t21s elapsed by a time period Δtp1 from the time when the storage of the signal charge in the photodiode 2 in the first row (the photodiode 2 in the first row and the first column) is started (reset). Similarly, the time when the storage of the signal charge in the photodiode 2 in the third row is started is the time t31s elapsed by a time period Δtp1 from the time when the storage of the signal charge in the photodiode 2 in the second row is started, and the time when the storage of the signal charge in the photodiode 2 in the fourth row is started is the time t41s elapsed by a time period Δtp1 from the time when the storage of the signal charge in the photodiode 2 in the third row is started.

From the foregoing, in a case where all pixels are read out, the frame rate is a time period t1+Δtp1×(number of photodiodes belonging to one column, e.g. 480).

Figure 6:
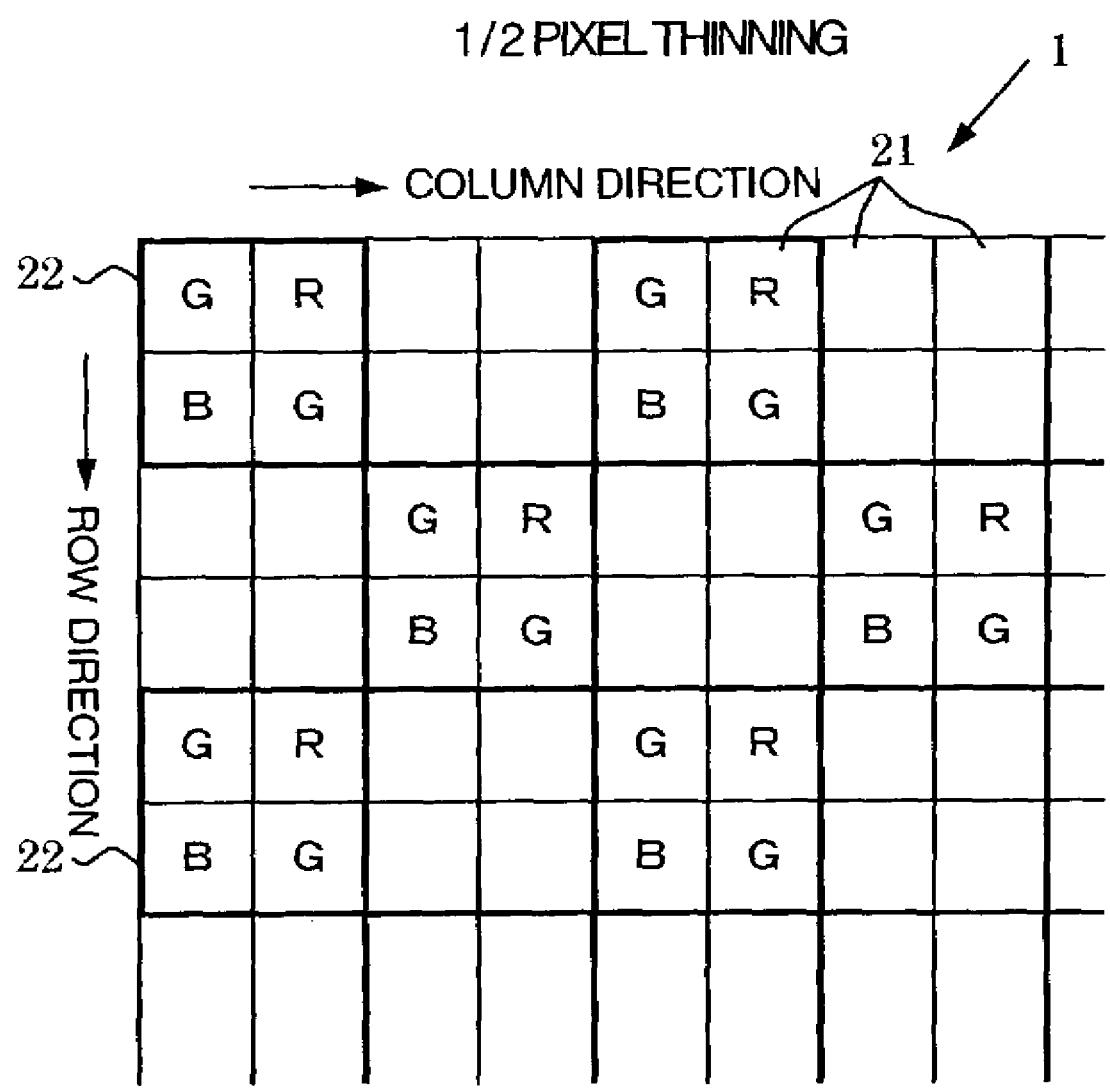
FIG. 6 illustrates a part of a light receiving surface of a CMOS type image sensor (in a case of ½ pixel thinning)

FIG. 6 illustrates a part of the light receiving surface of the CMOS type image sensor 1 in which marks R, G, B are indicated on the pixels which are subjected to readout of the signal charges in ½ pixel thinning.

One color pixel is produced using image data representing four R, G, and B pixels adjacent to one another in the column direction and the row direction. In ½ pixel thinning, therefore, the four GRGB pixels are considered as one set 22. The readout of the video signal from the CMOS type image sensor 1 is controlled so as to obtain such an image that the sets 22 appear every other one in the column direction and the row direction. A section 21 indicated by R, G, or B is a section from which the video signal is to be read out, and a section 21 which is a blank is a section to be thinned.

Switching control pulses are respectively outputted from the vertical scanning circuit 8 and the horizontal scanning circuit 7 such that video signals respectively representing a pixel in the (4n+1)-th column (n is an integer of zero or more) and a pixel in the (4n+2)-th column are read out with respect to the (4n+1)-th row and the (4n+2)-th row in the CMOS type image sensor 1, and video signals respectively representing a pixel in the (4n+3)-th column and a pixel in the (4n+4)-th column are read out with respect to the (4n+3)-th row and the (4n+4)-th row, and are fed to the first switching device 3 and the second switching device 5.

Figure 7:
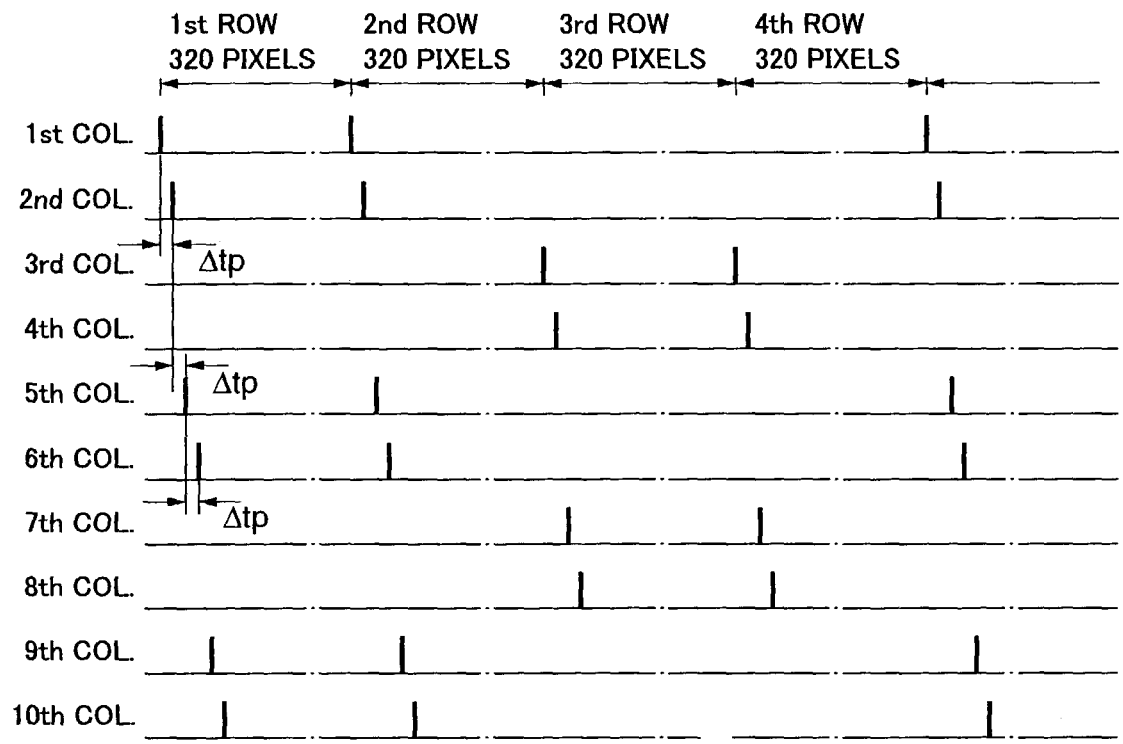
FIG. 7 illustrates a waveform showing an output signals from a horizontal scanning circuit in the ½ pixel thinning.
Figure 8:
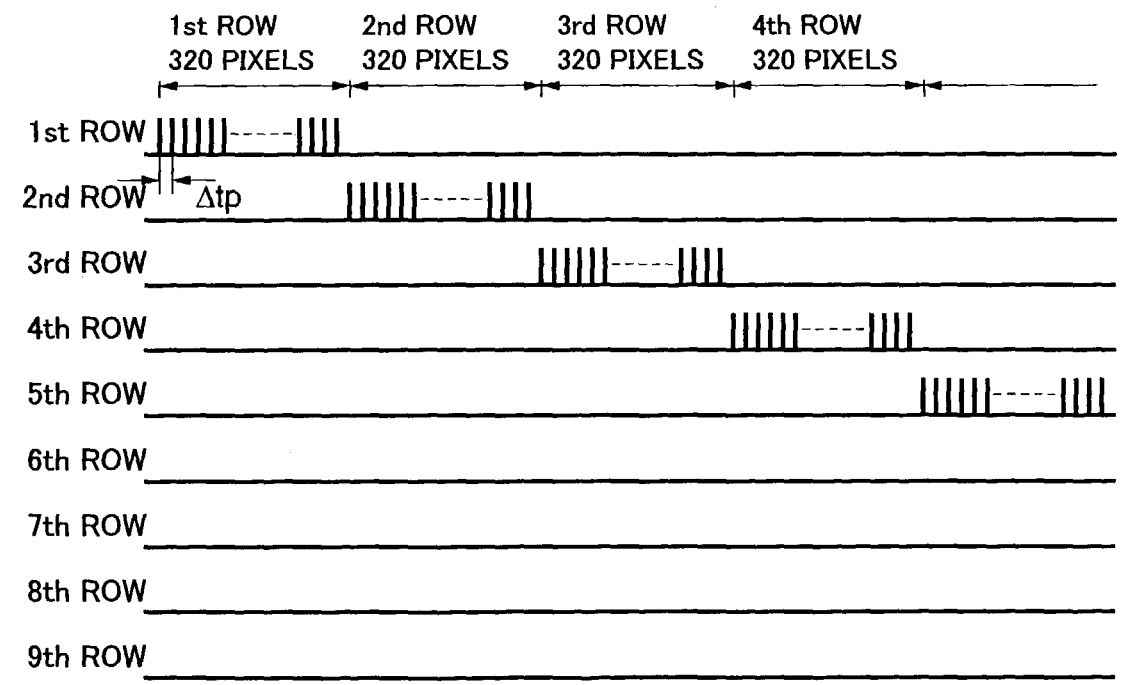
FIG. 8 illustrates a waveform showing an output signals from a vertical scanning circuit in the ½ pixel thinning.

FIG. 8 shows a part of control signals (first switching control pulses) for controlling the first switching device 3 outputted from the vertical scanning circuit 8, and FIG. 7 shows a part of control signals (second switching control pulses) for controlling the second switching device 5 outputted from the horizontal scanning circuit 7. The time period Δtp is the time period corresponding to the pixel rate.

It will be understood successive two-pixel readout is repeated in the row and column directions, skipping two pixels.

Figure 9:
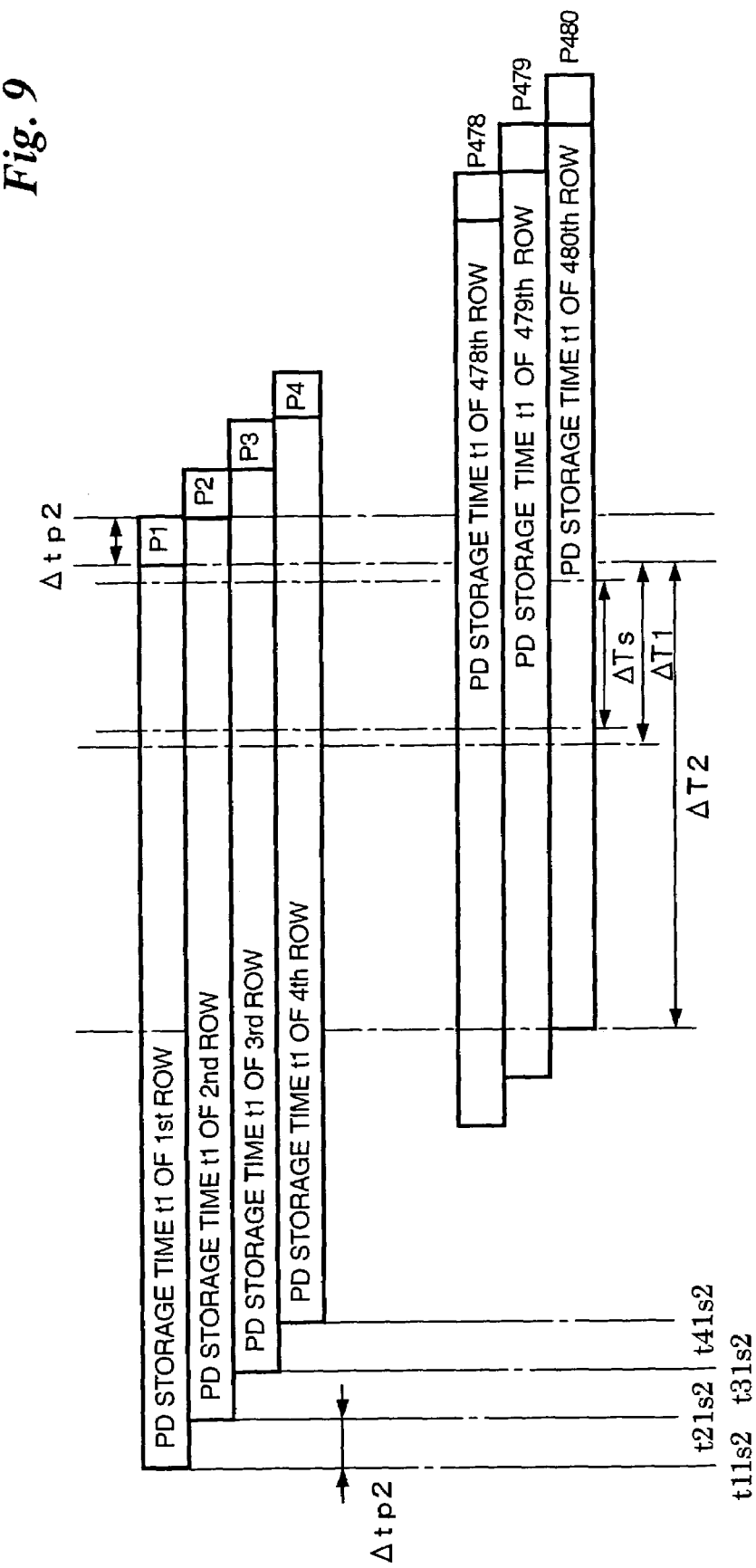
FIG. 9 is a timing chart in readout by ½ pixel thinning.

FIG. 9 is a timing chart corresponding to FIG. 4 in readout by ½ pixel thinning (one of the specified mode).

In order to clarify the difference from all-pixel readout, a time period required for the photodiode 2 to accumulate the signal charge is set to t1, similarly to that in the case of all-pixel readout.

In the case of readout by ½ pixel thinning, the number of photodiodes producing the video signal outputted from the CMOS type image sensor 1 is one-half that in the case of all-pixel readout. Therefore, a time period required for analog processing corresponding to one row in the analog processing circuit 20 is one-half the time period required for analog processing corresponding to one row in the case of all-pixel readout ($\Delta tp2 = \Delta tp1/2$).

The time period required for the analog processing corresponding to one row is shortened, thereby making it possible to make the time when the storage in the photodiode of the next row is started earlier by a shortened length of the time period. Letting t11s2 be the time when the storage in the photodiode 2 in the first row is started, the time when the storage in the photodiode 2 in the second row is started is t21s2 elapsed by a time period $\Delta tp2$ from the time t11s2. Similarly, the times when the storage in the photodiodes 2 in the third row and the fourth row are respectively t31s2 and t41s2 elapsed respectively by $2\Delta tp2$ and $3\Delta tp2$ from the time t11s2 when the storage is started in the first row. The number of photodiodes from which signal charges are to be read out in each of the rows is thus reduced, so that the time period required for the analog processing is shortened. As a result, when the start of the storage in the photodiode 2 in each of the rows is advanced, a time period $\Delta T2$ while all the photodiodes 2 simultaneously accumulate the signal charges becomes longer than the time period $\Delta T1$ while all the photodiodes 2 simultaneously accumulate the signal charges in the case of all-pixel readout, even if the signal charge accumulation time period t1 (exposure time period) is maintained unchanged.

The common time period $\Delta T2$ while all the photodiodes 2 simultaneously accumulate the signal charges may be approximately a time period including a time period required to flash strobe $\Delta ts$. Accordingly, the time common period $\Delta T2$ can be shortened to near the time period $\Delta T1$.

Figure 10:
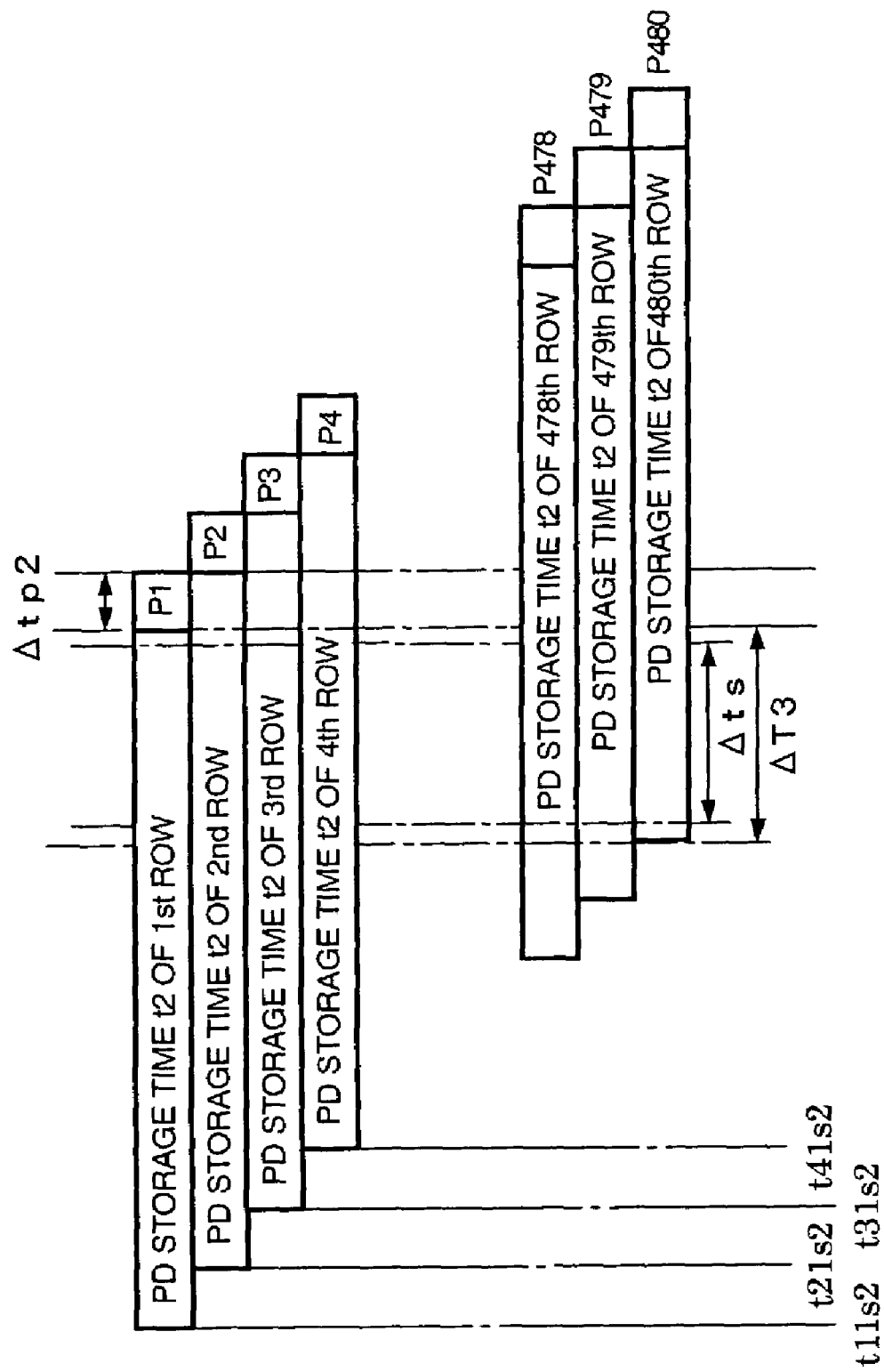
FIG. 10 is a timing chart in readout by ½ pixel thinning (in a case where a common time period is shortened)

FIG. 10 is a timing chart in a case where the common time period $\Delta T2$ is shortened to the time period $\Delta T3$ ($\Delta T3 > \Delta ts$) in readout by ½ pixel thinning.

The common time period is set to $\Delta T3$ which is a time period slightly wider than the time period required to flash strobe $\Delta ts$. The common time period is set to $\Delta T3$, whereby a time period (exposure time period) t2 required for storage for each row is made shorter, as compared with the time period (exposure time period) t1 required for storage in the case of all-pixel readout. As a result, a shutter speed becomes higher and the start of the imaging of the subsequent frame can be advanced, thereby making it possible to increase the frame rate.

Figure 11:
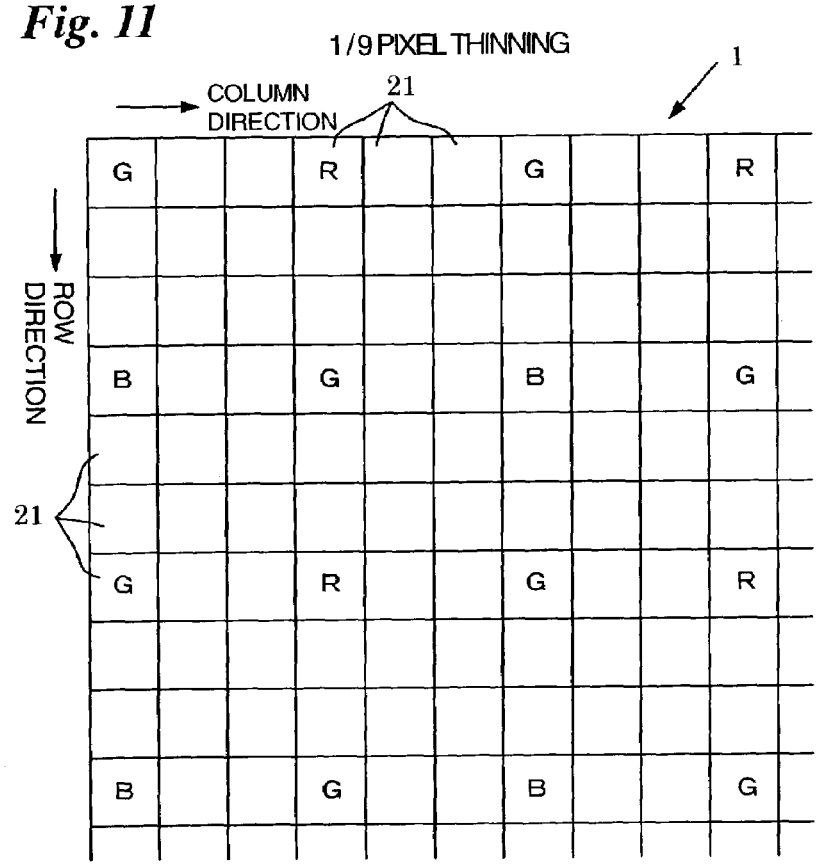
FIG. 11 illustrates a part of a light receiving surface of a CMOS type image sensor (in a case of ⅙ pixel thinning)

FIG. 11 illustrates a light receiving surface of the CMOS type image sensor 1 in a case where ⅓ pixel thinning is performed. The marks R, G, B are written on the pixels from which signal charges are read out.

When ⅓ pixel thinning is performed, signal charges are read out from the pixels (photodiodes) in the (3n+1)-th row and in the (3m+1)-th column (m is zero or positive integer), but signal charges are not read out from the pixels (photodiodes) in the (3n+2)-th row and the (3n+3)-th row and the pixels (photodiodes) in the (3n+2)-th column and the (3n+3)-th column. The readout of the signal charges can be realized by controlling an output of a switching control pulse such that the corresponding switching devices 3 and 5 are turned on, as in the above-mentioned readout by ½ pixel thinning.

In this case, it will be understood that the number of photodiodes contributing to the video signal outputted from the CMOS type image sensor 1 is further made smaller than that in the case of readout by ½ pixel thinning, thereby making it possible to further reduce the frame rate.

Figure 12:
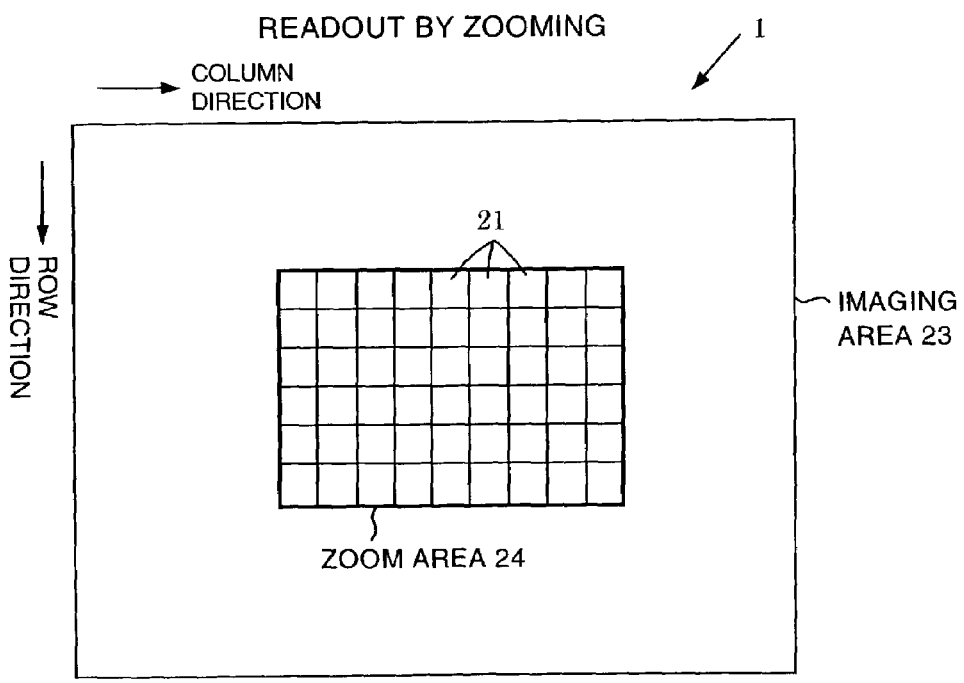
FIG. 12 illustrates a part of a light receiving surface of a CMOS type image sensor (readout by zooming).

FIG. 12 illustrates a light receiving surface of the CMOS type image sensor 1 in a case where readout by zooming is performed.

The CMOS type image sensor 1 is controlled such that a video signal based on signal charges respectively accumulated in the photodiodes 2 corresponding to a zoom area 24 which is a part of an imaging area (an all light receiving surfaces of the CMOS type image sensor 1) 23 is outputted.

Such a zoom area 24 may be previously set, or may be settable by the user.

Even when readout by zooming is performed, the number of photodiodes contributing to the video signal corresponding to one frame outputted from the CMOS type image sensor 1 is reduced, thereby reducing the frame rate. In short, the number of photodiodes contributing to the video signal outputted from the CMOS type image sensor 1 may be reduced.

In this way, in the specified mode, the number of photodiodes from which signal charges are to be read out is reduced, and the photodiodes from which signal charges are to be read out are driven so as to be provided with the common signal charge accumulation time period, during which strobe light is flashed by the strobe flashing device 12 under the control of the control device 10.

Even in a case where strobe is not flashed, it goes without saying that the number of photodiodes contributing to the video signal outputted from the CMOS type image sensor 1 may be reduced (the common time period may be, or may not be provided)

Although in the above-mentioned embodiment, the video signal based on the signal charges respectively accumulated in the photodiodes 2 corresponding to the zoom area 24 in the imaging area 23 is outputted, a video signal based on signal charges respectively accumulated in the photodiodes 2 corresponding to a part of the imaging area 23 (which may be not only a central portion but also a portion other than the central portion) may be outputted. For example, an area where a subject image is focused may be detected (which will be provided with an in-focus area detection circuit) so that a video signal based on signal charges respectively accumulated in the photodiodes 2 corresponding to the area where the subject image is focused is outputted.

Although in the above-mentioned embodiment, description was made of a case where used as the image sensor is one of a CMOS type, it goes without saying that not only the CMOS type image sensor but also other image sensors such as a CID type image sensor can be utilized. Further, the present invention is also applicable to not only a camera for imaging a subject using an image sensor but also a hybrid type camera also having the function of optically recording a subject image on a film. Further, the present invention is also applicable to not only a digital camera for recording digital image data on a digital recording medium but also an electronic camera for recording an analog video signal on an analog recording medium.

Although the present invention has been described and illustrated in detail, it is clearly understood that the same is by way of illustration and example only and is not to be considered by way of limitation, the spirit and scope of the present invention being limited only by the terms of the appended claims.

What is claimed is:

1. A solid-state electronic image pickup apparatus comprising:
    an image sensor having a lot of photoelectric conversion devices two dimensionally arranged, wherein a signal charge accumulation time period and readout timing of the signal charge are individually controllable for each photoelectric conversion device; and
    a drive circuit for controlling, in a specified mode in which signal charges are read out from a plurality of specified photoelectric conversion devices which are a part of whole photoelectric conversion devices of said image sensor, reset timing and readout timing of the signal charge for all specified photoelectric conversion devices successively and at a predetermined time interval, such that the signal charge accumulation time periods assigned to each of all specified photoelectric conversion devices are equal to each other and include a common time period when the signal charge accumulation time period of all specified photoelectric conversion devices are partially overlapped with each other.

2. The apparatus according to claim 1, wherein said drive circuit operates in the specified mode when a strobe flashing mode is set, and the apparatus further includes a control device for controlling a strobe flashing device such that strobe is flashed in the common time period.

3. The apparatus according to claim 1, wherein the specified photoelectric conversion devices are photoelectric conversion devices arranged in a part of the imaging area of said image sensor.

4. The apparatus according to claim 3, wherein said part area is a central part of the imaging area.

5. The apparatus according to claim 1, wherein the specified photoelectric conversion devices are a set of photoelectric conversion devices regularly selected in the imaging area of said image sensor.

6. The apparatus according to claim 1, wherein said image sensor includes a lot of photoelectric conversion devices arranged in the row direction and the column direction in the imaging area, and the specified photoelectric conversion devices are a set of photoelectric conversion devices selected by thinning out in the row direction and column direction.

7. The apparatus according to claim 1, wherein said image sensor comprises a lot of photoelectric conversion devices arranged in the row direction and the column direction in the imaging area, vertical signal lines, each formed adjacent to each of columns of photoelectric conversion devices for transmitting in the vertical direction a signal corresponding to signal charges respectively accumulated in the photoelectric conversion devices, first semiconductor switching devices provided between said photoelectric conversion devices and said vertical signal line, a horizontal signal line for transmitting in the horizontal direction the signal transmitted from said vertical signal line, and second semiconductor switching devices each provided between said vertical signal line in each of the columns and said horizontal signal line, and outputs the signal charges respectively accumulated in the photoelectric conversion devices as a video signal from the horizontal signal line,
    said drive circuit, on reading the signal charge out of each specified photoelectric conversion device, controls the first and second switching devices corresponding to each specified photoelectric conversion device so as to select each specified photoelectric conversion device successively along the row and column directions and at the predetermined time interval.

8. An electronic camera including said solid-state electronic image pickup apparatus according to claim 1, further comprising:
    recording control means for recording on a recording medium a video signal outputted from said solid-state electronic image pickup apparatus.

9. A method of driving a solid-state electronic image pickup apparatus, comprising the steps of:
    using an image sensor having a lot of photoelectric conversion devices two dimensionally arranged, wherein a signal charge accumulation time period and readout timing of the signal charge are individually controllable for each photoelectric conversion device; and
    controlling, in a specified mode in which signal charges read out from a plurality of specified photoelectric conversion devices which are a part of whole photoelectric conversion devices of said image sensor, reset timing and readout timing of the signal charge for all specified photoelectric conversion devices successively and at a predetermined time interval, such that the signal charge accumulation time periods assigned to each of all specified photoelectric conversion devices are equal to each other and include a common time period when the signal charge accumulation time period of all specified photoelectric conversion devices are partially overlapped with each other.

10. The method according to claim 9, further comprising the steps of:
    driving said image sensor in the specified mode when a strobe flashing mode is set, and controlling a strobe flashing device such that strobe is flashed in the common time period.

* * * * *